E. M. McGOWAN.
FENDER FOR AUTOMOBILES.
APPLICATION FILED OCT. 22, 1912.
1,060,475.
Patented Apr. 29, 1913.
3 SHEETS—SHEET 1.
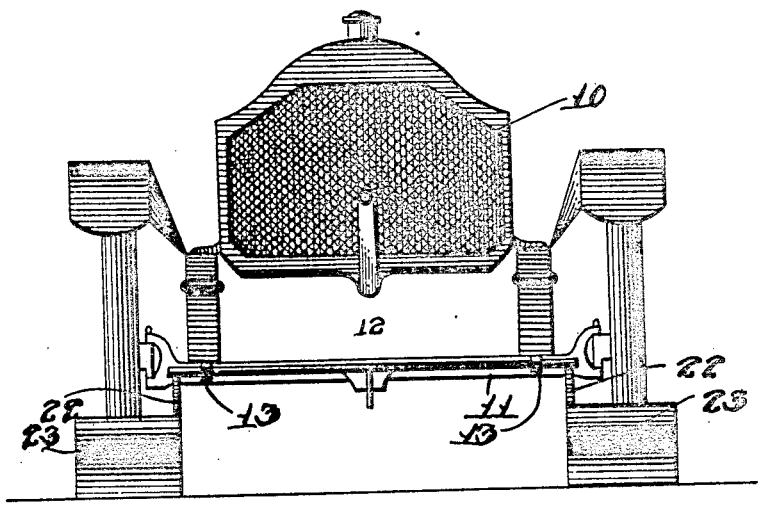
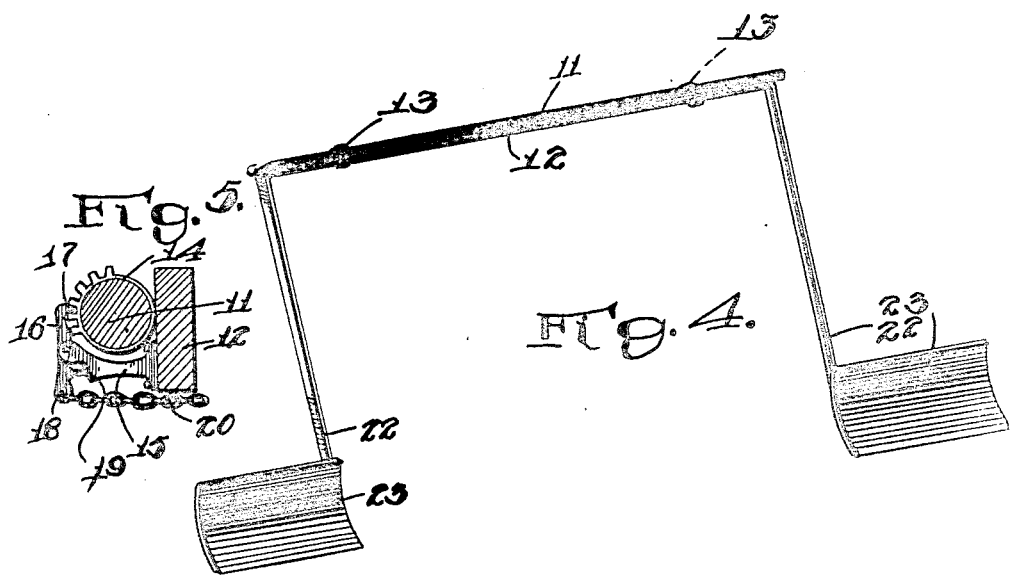
WITNESSES
INVENTOR
Edward M. McGowan
By his Attorney E. M. McGOWAN.
FENDER FOR AUTOMOBILES.
APPLICATION FILED OCT. 22, 1912.

1,060,475.

Patented Apr. 29, 1913.
2 SHEETS—SHEET 2.

WITNESSES

INVENTOR
Edward M. McGowan
By E. E. Yeoman, his Attorney.

UNITED STATES PATENT OFFICE.

EDWARD M. McGOWAN, OF FOND DU LAC, WISCONSIN.

FENDER FOR AUTOMOBILES.

1,060,475.

Specification of Letters Patent.   Patented Apr. 29, 1913.

Application filed October 22, 1912.  Serial No. 727,226.

*To all whom it may concern:*

Be it known that I, EDWARD M. McGOWAN, a citizen of the United States, residing at Fond du Lac, in the county of Fond du Lac and State of Wisconsin, have invented certain new and useful Improvements in Fenders for Automobiles, of which the following is a specification, reference being had therein to the accompanying drawing.

This invention relates to vehicles and has special reference to a fender for automobiles.

The principal object of this invention is to improve and simplify the general construction of devices of this character.

The second object of the invention is to provide a fender for the front wheels of automobiles of novel construction, and which will normally be held in raised position but which may readily be dropped to prevent injury to a person unable to get out of the path of the machine.

With the above and other objects in view, this invention consists in general of certain constructions, combinations and arrangements of parts, as will be hereinafter fully described, illustrated in the accompanying drawings, and specifically claimed.

Figure 3:
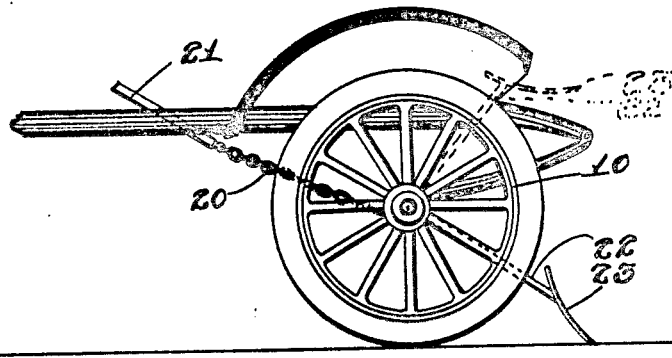
Figure 2:
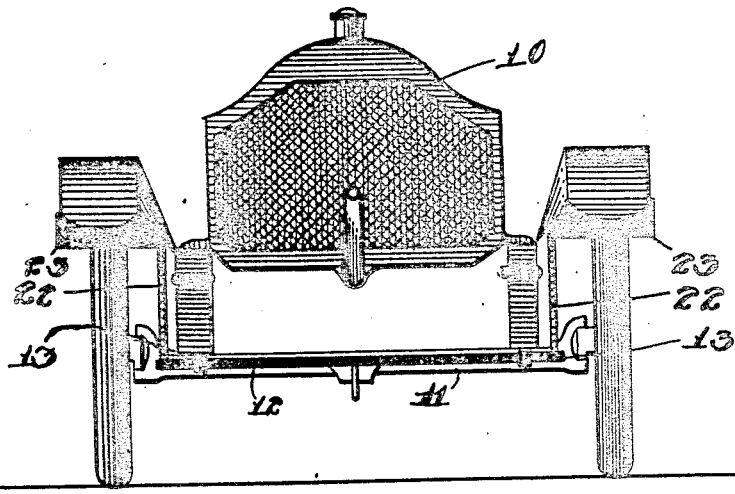

In the accompanying drawings, like characters of reference indicate like parts in the several views, and:—Figure 1 is a front view of an automobile showing the fender dropped. Fig. 2 is a similar view showing the fender raised. Fig. 3 is a side elevation of an automobile front end showing the fender dropped in full position, and raised in dotted position. Fig. 4 is a perspective view of the fender removed from the automobile. Fig. 5 is a detail view of the means employed to hold the fender in raised position.

In carrying out the objects of this invention there is disclosed in the present embodiment an automobile indicated in general at 10 which is provided with a front axle 11 whereto is connected a bar 12 of U-shape, the bar being secured to the front axle by means of pivot clips 13 so that the bar is freely rotatable with reference to the axle. Fixedly secured to the axle 11 is a toothed ring 14, and mounted on the bar 12 is a bracket 15 whereto is pivoted a lever 16 having an end 17 arranged to engage in the space between any two adjacent teeth. This end 17 is normally held in such engagement by means of a spring 18 having one end bearing against a shoulder 19 formed on the bracket, and the other end bearing against the lever 16. Connected to the end of the lever opposite the end 17 is a chain 20 whereto is connected a rod 21 positioned convenient to the driver so that by pulling thereon the end 17 of the lever may be drawn out from between the teeth, and the bar 12 permitted to rotate. The arms of this bar 12 are indicated at 22, and on each of these arms is carried a curved fender plate or guard 23 so arranged that it is in alinement with the front wheels, said plates extending laterally from the arms 22 of the bar 12. Under normal circumstances the plates 23 are carried in raised position as indicated in dotted lines in Fig. 3, the arms 22 being held in this position by the lever 16. When, however, danger exists of striking a person, the bar 21 is drawn upon, with the result that the lever is released and the plates 23 fall in front of the wheels, thus preventing a person from being run over by the machine.

There has thus been provided a simple and efficient device of the character described, and for the purpose specified.

Having thus described the invention, what is claimed as new, is:—

In a device of the kind described, the combination with a vehicle provided with a front axle and wheels mounted thereon, of a U-shaped bar having its bight portion pivotally connected to said axle, fender plates carried by said bar and lying in alinement with said wheels, a toothed ring mounted on said axle, a bracket fixed to the bight of said bar, a lever pivoted to said bracket and having its end arranged to enter the space between adjacent teeth on the ring, a spring holding said lever in engagement with said ring, and releasing means connected to the lever.

In testimony whereof I hereunto affix my signature in presence of two witnesses.

EDWARD M. McGOWAN.

Witnesses:
Jos. L. GORMICAN,
RAY D. MANN.

Copies of this patent may be obtained for five cents each, by addressing the "Commissioner of Patents,
Washington, D. C."